(12) United States Patent
Ong et al.

(10) Patent No.: US 12,693,135 B2
(45) Date of Patent: Jul. 28, 2026

(54) MAGNETIC ENCODER SYSTEMS AND METHODS THEREOF

(71) Applicant: Avago Technologies International Sales Pte. Limited, Singapore (SG)

(72) Inventors: Heem Leong Ong, Penang (MY); Childs Chang, Penang (MY); Md Nazri Bin Md Minawar, Penang (MY); Kheng Hin Toh, Penang (MY); Mohd Syaril Bin Mohd Rafaee, Penang (MY)

(73) Assignee: Avago Technologies International Sales Pte. Limited, Singapore (SG)

( * ) Notice: Subject to any disclaimer, the term of this patent is extended or adjusted under 35 U.S.C. 154(b) by 183 days.

(21) Appl. No.: 18/359,186

(22) Filed: Jul. 26, 2023

(65) Prior Publication Data

US 2025/0035467 A1     Jan. 30, 2025

(51) Int. Cl.
G01D 5/14          (2006.01)
(52) U.S. Cl.
CPC .................................... G01D 5/145 (2013.01)
(58) Field of Classification Search
CPC ........................................................ G01D 5/145
See application file for complete search history.

(56) References Cited

U.S. PATENT DOCUMENTS

| | | | |
|---|---|---|---|
| 6,498,409 B1 * | 12/2002 | Collier-Hallman .... | G01D 5/145 |
| | | | 310/68 B |
| 2017/0219665 A1 * | 8/2017 | Alpago ................ | G01D 5/2448 |
| 2018/0231400 A1 * | 8/2018 | Okumura ............. | G01D 5/2454 |
| 2021/0255003 A1 * | 8/2021 | Ong ....................... | G01D 5/145 |

* cited by examiner

Primary Examiner — Stephanie E Bloss
Assistant Examiner — Michael A Harrison
(74) Attorney, Agent, or Firm — Quarles & Brady LLP

(57) ABSTRACT

The subject technology is directed to encoder systems and methods. According to an embodiment, the subject technology provides a magnetic encoder that comprises a first magnet and a second magnet. The first magnet comprises a first pole pair and an opening. The second magnet comprises a second pole pair and is positioned inside the opening. The magnetic encoder further comprises a first sensor that is configured to detect and generate a first signal based on the magnetic flux orientation of the first magnet and a second sensor that is configured to detect and generate a second signal based on the magnetic flux orientation of the second magnet. To achieve this feat, the first magnet and second magnet are magnetized in two separate types of magnetization (e.g., diametrical or axial magnetization) to generate two separate types of magnetic flux orientations that could be detected via the two types of magnetic sensors.

15 Claims, 10 Drawing Sheets

MAGNETIC ENCODER SYSTEMS AND METHODS THEREOF

FIELD OF INVENTION

The subject technology is directed to encoder systems and methods.

BACKGROUND OF THE INVENTION

Over the past decade, encoders have become an essential component for a multitude of devices to provide feedback mechanisms and signal control capabilities. Various approaches involve converting physical motion into electrical signals to obtain information on position, count, velocity, acceleration, direction, or the like. For instance, rotary encoders utilize a variety of techniques (e.g., optical, mechanical, magnetic, etc.) to convert the angular position of a shaft into electrical signals. Among other techniques, magnetic encoders—which use magnetic fields to detect the change in position—are becoming increasingly popular due to their robustness and durability under various environmental conditions.

Various approaches for implementing magnetic encoders have been explored, but they have proven to be insufficient. It is important to recognize the need for new and improved magnetic encoder systems and their encoding processes.

DETAILED DESCRIPTION OF THE INVENTION

Figure 1:
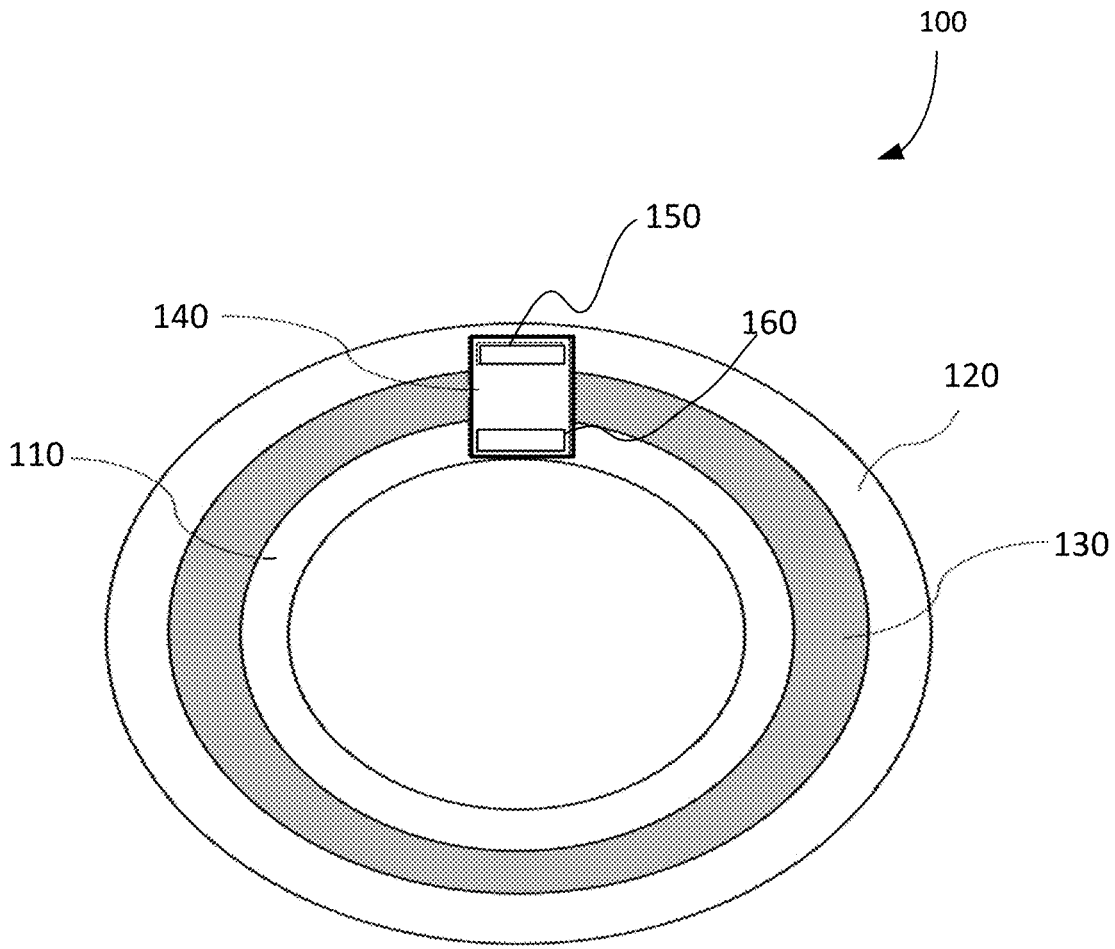
FIG. 1 is a simplified diagram illustrating a magnetic encoder according to embodiments of the subject technology.

The subject technology is directed to encoder systems and methods. According to an embodiment, the subject technology provides a magnetic encoder that comprises a first magnet and a second magnet. The first magnet comprises a first pole pair and an opening. The second magnet comprises a second pole pair and is positioned inside the opening. The magnetic encoder further comprises a first sensor that is configured to detect and generate a first signal based on a first magnetic flux orientation of the first magnet and a second sensor that is configured to detect and generate a second signal based on a second magnetic flux orientation of the second magnet. To achieve this feat, the first magnet and the second magnet are magnetized in two separate types of magnetization (e.g diametrical or axial magnetization) to generate two separate types of magnetic flux orientations that could be detected via the two types of magnetic sensors configured within the system of the magnetic encoder.

Some approaches for implementing magnetic encoders rely on simply a single North/South pole pair, generating only a pair of signals (e.g., a pair of sine/cosine signals) for each full magnet rotation (e.g., a 360° rotation). Consequently, the accuracy and performance of such magnetic encoders are limited by the quality and integrity of the single pair of signals. Any disruption (e.g., noise, distortion, or interference from external magnetic fields) directly impacts the quality and integrity of these signals, resulting in lower resolution and positional accuracy.

In various embodiments as illustrated in FIGS. 1 to 7, the subject technology enables magnetic encoders to detect meaningful and robust signals within each full magnet rotation to then generate a system with high accuracy, resolution, and hence performance. To achieve this instance, the magnetic encoder comprises a first magnet and a second magnet, one of which comprises a plurality of pole pairs that allow for the generation of plurality signals within a full magnet rotation, while the other consists of a single pole pair that allows for the generation of a single pair of signal within a full magnetic rotation. The former enables more signals to be generated within a single rotation, hence improving the magnetic encoders' performance while the latter is used by the system to accurately determine when the rotation begins or ends for use of computation. The magnetic encoder further comprises a first sensor and a second sensor configured to generate a first signal and a second signal associated with the magnetic fields generated by the first magnet and the second magnet, respectively. Subsequently, through one or more stages of signal processing (e.g., amplifying, signal conditioning, synchronization, and/or the like), the first signal and the second signal can be used to determine the position with improved precision.

One general aspect of the subject technology provides a magnetic encoder device, which includes a first magnet. The first magnet may include a first pole pair and an opening. The device also includes a second magnet, which may include a second pole pair, the second magnet being positioned inside the opening. The device also includes a first sensor positioned at a first proximity near the first magnet, the first sensor being configured to generate a first signal based on the magnetic flux associated with the first magnet. In an example, the first sensor is configured to generate a first signal based on a first magnetic flux orientation associated with the first magnet. The device also includes a second sensor at a second proximity near the second magnet, the second sensor being configured to generate a second signal based on a second magnetic flux orientation associated with the second magnet. The magnetic sensors used can be Hall Sensors or other types of magnetosensitive sensors, such as Anisotropic Magnetoresistive (AMR) sensors, Giant Magnetoresistive (GMR) sensors, and Tunnelling Magnetoresistive (TMR) sensors. For example, the combination of one or more types of mentioned sensors can be possible as long as they are placed in proximity to the first magnet and the second magnet as illustrated by the embodied designs of this invention to detect the two magnetic flux orientations of the first magnet and the second magnet. The device also includes a processor configured to determine a position using at least the first signal and the second signal. The processor could be a single device of a Microcontroller Unit (MCU), an Application Specific Integrated Chip (ASIC), and/or other forms of silicon-based embedded chips.

Implementations may include one or more of the following features. The first magnet is characterized by a ring shape. The second magnet is characterized by a second shape, the first magnet and the second magnet share a center. The first magnet may include a rotational axis, the first sensor being positioned off the rotational axis. A first magnetic flux direction or orientation of the first magnet is different from the second magnetic flux of the second magnet at the first proximity. In an example, the first magnetic flux of the first magnet is greater than the second magnetic flux of the second magnet at the first proximity. The first pole pair is characterized by a diametrical magnetization and the second pole pair is characterized by an axial magnetization. For example, the inverse of magnetization type between the first magnet and the second magnet functions just as well, with the first pole pair being characterized by an axial magnetization and the second pole pair being characterized by a diametrical magnetization. The processor may include a differential difference amplifier configured to remove interferences between the first signal and the second signal. The processor is configured to synchronize the first signal and the second signal. The processor may include an analog-to-digital converter (ADC) configured to convert the first signal and the second signal to digital signals. The first magnet may include a plurality of pole pairs and the second magnet may consist of the second pole pair. The second magnet may include a plurality of pole pairs and the first magnet may consist of the first pole pair. The first signal and the second signal comprise signals generated from magnetic sensors based on the two separate magnetic field orientations of the first and second magnets. In an example, the first signal may include a Hall voltage or current generated based on a first magnetic flux pattern of the first magnet. Implementations of the described techniques may include hardware, a method or process, or computer software on a computer-accessible medium.

According to another embodiment, the subject technology provides a magnetic encoder device, which includes a first magnet may include a first pole pair and an opening, the first magnet may include a first surface, the first magnet being characterized by a diametrical magnetization. In another example, the first magnet may be characterized by an axial magnetization. The device also includes a second magnet may include a plurality of pole pairs and a second surface, the second magnet being positioned inside the opening, the second magnet being characterized by an axial magnetization. In another example, the first magnet may be characterized by a diametrical magnetization. The device also includes a magnetic sensor that detects parallel magnetic fields cutting across the first surface, the magnetic sensor being configured to generate a first signal based on the first magnet. The device also includes a magnetic sensor that detects horizontal or perpendicular magnetic fields positioned over the second surface, the magnetic sensor being configured to generate a second signal based on the second magnet. In some embodiment, the device may include a vertical sensor positioned over the first surface, the vertical sensor being configured to generate a first signal based on a first magnetic flux orientation associated with the first magnet. The device may also include a horizontal sensor positioned over the second surface, the horizontal sensor being configured to generate a second signal based on a second magnetic flux orientation associated with the second magnet. The device also includes a processor configured to remove a difference between the first signal and the second signal and to determine a position using at least the first signal and the second signal.

Implementations may include one or more of the following features. The magnetic encoder device where the vertical or parallel magnetic field sensor may include a Vertical Hall Sensor, AMR, GMR, or TMR, and the perpendicular or horizontal magnetic field sensor may include a Horizontal Hall sensor, AMR, GMR or TMR. The first magnet and the second magnet are characterized by a ring shape and share a center. The processor is configured to synchronize the first signal and the second signal. Implementations of the described techniques may include hardware, a method or process, or computer software on a computer-accessible medium.

According to yet another embodiment, the subject technology provides a magnetic encoder device, which includes a first magnet. The first magnet may include a plurality of pole pairs and an opening. The device also includes a second magnet may include a first pole pair, the second magnet being positioned inside the opening. The device also includes a first sensor positioned at a first proximity of the first magnet, the first sensor being configured to generate a first signal based on the magnetic fields of the first magnet. In an example, the first sensor may be configured to generate a first signal based on a first magnetic flux orientation associated with the first magnet. The device also includes a second sensor positioned at a second proximity of the second magnet, the second sensor being configured to generate a second signal based on a second magnetic flux orientation associated with the second magnet. In an example, the second sensor may be configured to generate a second signal based on a second magnetic flux orientation associated with the second magnet. The device also includes an amplifier configured to remove a difference between the first signal and second signal and to provide a first amplified signal and a second amplified signal. The device also includes an analog-to-digital converter configured to convert the first amplified signal to a first digital signal and to convert the second amplified signal to a second digital signal. The device also includes a synchronization module configured to synchronize the first digital signal and the second digital signal.

Implementations may include one or more of the following features. The magnetic encoder device where the amplifier may include a differential-difference amplifier. A first most significant bit of the first digital signal is synchronized with a second most significant bit of the second digital signal. The synchronization module is further configured to remove mismatches between the first digital signal and the second digital signal. Implementations of the described techniques may include hardware, a method or process, or computer software on a computer-accessible medium.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the subject technology is not intended to be limited to the embodiments presented, but is to be accorded the widest scope consistent with the principles and novel features disclosed herein.

In the following detailed description, numerous specific details are set forth in order to provide a more thorough understanding of the subject technology. However, it will be apparent to one skilled in the art that the subject technology may be practiced without necessarily being limited to these specific details. In other instances, well-known structures and devices are shown in block diagram form, rather than in detail, in order to avoid obscuring the subject technology.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

When an element is referred to herein as being "disposed" in some manner relative to another element (e.g., disposed on, disposed between, disposed under, disposed adjacent to, or disposed in some other relative manner), it is to be understood that the elements can be directly disposed relative to the other element (e.g., disposed directly on another element), or have intervening elements present between the elements. In contrast, when an element is referred to as being "disposed directly" relative to another element, it should be understood that no intervening elements are present in the "direct" example. However, the existence of a direct disposition does not exclude other examples in which intervening elements may be present.

Similarly, when an element is referred to herein as being "bonded" to another element, it is to be understood that the elements can be directly bonded to the other element (without any intervening elements) or have intervening elements present between the bonded elements. In contrast, when an element is referred to as being "directly bonded" to another element, it should be understood that no intervening elements are present in the "direct" bond between the elements. However, the existence of direct bonding does not exclude other forms of bonding, in which intervening elements may be present.

Moreover, the terms left, right, front, back, top, bottom, forward, reverse, clockwise and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require the selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

FIG. 1 is a simplified diagram illustrating a magnetic encoder system 100 according to embodiments of the subject technology. This diagram merely provides an example, which should not unduly limit the scope of the claims. For instance, the term "magnetic encoder" can refer to a type of rotary encoder that uses one or more sensors to identify changes in magnetic fields from a rotating device (e.g., a magnetized wheel or ring) and generate signals indicating the precise measurement of angular position. In various embodiments, magnetic encoder processor 140 may be implemented in a system-on-chip (SoC) arrangement.

As shown, magnetic encoder system 100 includes a first magnet 120 and a second magnet 110. For example, "magnet" may refer to a material or object that produces a magnetic field (e.g., a force field that either pulls or repels certain materials, such as nickel or iron) and can include, without limitation, a permanent magnet, a temporary magnet, an electromagnet, or the like. In an example, first magnet 120 and second magnet 110 are magnetized with different magnetizations to generate separate magnetic flux orientations. First magnet 120 may include a first pole pair (not shown) and an opening 130. Second magnet 110 may be positioned inside opening 130 and include a second pole pair (not shown). As an example, in describing the placement of the magnets, we use the phrase "positioned inside" to refer to any configuration where at least a portion of the second magnet 110 is located within the boundary defined by opening 130. This may include, but is not limited to, situations where the second magnet 110 is fully positioned inside opening 130 (e.g., a surface of second magnet 110 may be flush with a surface of first magnet 120), as well as scenarios where only part of the second magnet 110 is located within the confines of opening 130 (e.g., one edge, side, or any portion of second magnet 110 extends beyond the boundary of opening 130, while the remainder of the magnet is within opening 130). For instance, "pole pair"

may refer to a pair of north and south poles, which are associated with the direction of the magnetic field.

Depending on the implementation, first magnet 120 and second magnet 110 may be configured in various geometries. As an example, first magnet 120 is characterized by a first shape (e.g., a ring shape, a circular shape, or the like). Second magnet 110 is characterized by a second shape (e.g., a ring shape, a circular shape, a round shape, or the like). In some cases, first magnet 120 and second magnet 110 may share a center. For example, first magnet 120 and second magnet 110 are configured as concentric rings. It is to be appreciated that in practice, first magnet 120 and second magnet 110 may not be exactly concentric due to the variations caused during manufacture or operation (e.g., manufacturing defects, vibration, noise, demagnetization, etc.), potentially resulting in imperfections in signal generation, which may be removed during subsequent signal processing stages, as will be described in further detail below.

According to some embodiments, magnetic encoder 100 further includes a sensing unit 140, which may include a first sensor 150 and a second sensor 160. First sensor 150 and second sensor 160 may be positioned to detect the magnetic field of the first magnet 120 and second magnet 110, respectively. For example, first sensor 150 is positioned at a first proximity near the first magnet, and second sensor 160 is positioned at a second proximity near the second magnet. As an example, the term "proximity" near a magnet refers to a location where it can effectively detect the magnetic field generated by the magnet, and the influence of magnetic fields from any other magnets is significantly weaker. In various embodiments, the magnetic sensors (e.g., first sensor 150, second sensor 160) placed in proximity to first magnet 120 and second magnet 110 can be two separate types of magnetic sensors, which may be used to detect two separate directions or orientations of magnetic fluxes.

In an example, first sensor 150 can detect and generate a first signal associated with the magnetic flux direction and orientation of first magnet 120. First sensor 150 can be configured to generate a first signal based on a first the magnetic flux orientation associated with the first magnet. The term "magnetic flux orientation" or "magnetic field direction" may refer to the direction or arrangement of the magnetic field lines produced by a magnetic material or device (e.g., first magnet 120, second magnet 110). In an example, second sensor 160 can detect and generate a second signal associated with a second magnetic flux orientation of second magnet 110. Second sensor 160 may be configured to generate a second signal based on a second magnetic field signal associated with the second magnet. In an example, second sensor 160 may be configured to generate a second signal based on the second magnetic flux orientation associated with the second magnet. Magnetic encoder 100 can be configured to measure a position of an object. The term "position" may refer to the spatial orientation and/or location of the object at a given point in time. This may include, but is not limited to, an absolute position, an incremental position, and/or the like. The term "absolute position" may refer to the exact location or orientation of the object (e.g., a rotating body) at a specific moment, independent of any previous or subsequent locations. This may be defined in relation to a fixed reference point. The term "incremental position" may refer to the change or movement in the position of the object (e.g., a rotating body) relative to its position at a prior point in time. This may be expressed as a displacement from an earlier measured position. Depending on the implementations, magnetic encoder 100 may be mounted on a rotating body (not shown, e.g., a rotor disc, a shaft, and/or the like) and can rotate relative to first sensor 150 and second sensor 160 during operation. For instance, magnetic encoder 100 can provide information about the angular position of the rotating body with respect to a selected reference (e.g., a rotational axis). As magnetic encoder 100 rotates, first sensor 150 and second sensor 160 can detect changes in magnetic fields and generate the first signal and the second signal respectively, allowing magnetic encoder 100 to track and measure the position (e.g., an angular position) of the rotating body. For instance, the first signal and the second signal may include electrical signals configured in sinusoidal waveforms. The first signal and the second signal may be used to determine a position (e.g., an angular position) of the encoder. As further described below, the first signal and second signals are later processed and used to determine the angular position and/or other information.

Figure 2A:
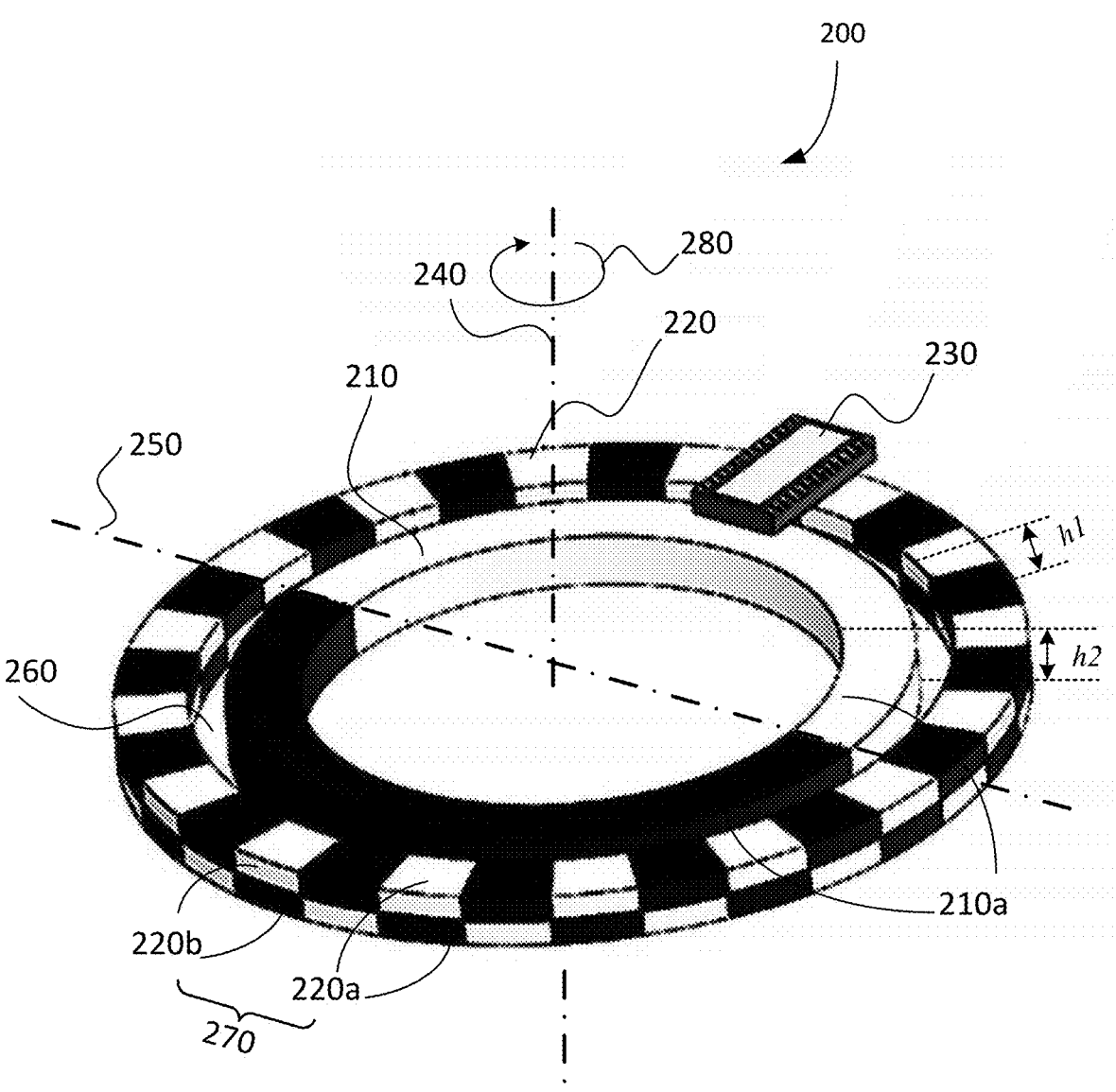
FIGS. 2A-2B are simplified diagrams illustrating an exemplary magnetic encoder configuration according to embodiments of the subject technology.
Figure 2B:
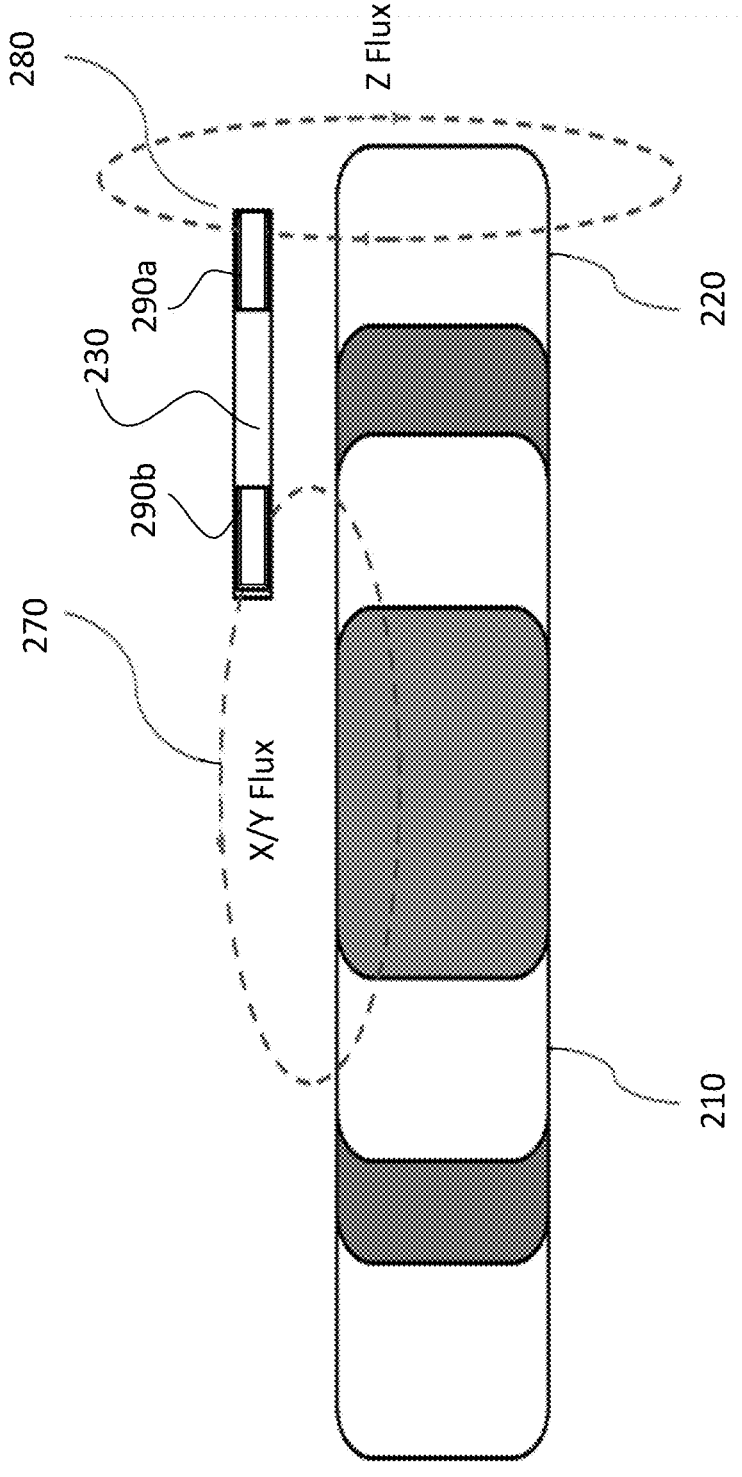

FIGS. 2A-2B are simplified diagrams illustrating an exemplary magnetic encoder 200 according to embodiments of the subject technology. These diagrams merely provide an example, which should not unduly limit the scope of the claims. As shown in FIG. 2A, magnet encoder 200 includes a first magnet 220 and a second magnet 210. For example, first magnet 220 includes a first pole pair 270, which can include a plurality of pole pairs (e.g., 220a, 220b, etc.) and an opening 260. Second magnet 210 may be positioned in opening 260 and include a second pole pair 210a, which may consist of a single pole pair. In other examples, first magnet 220 may consist of a single pole pair while second magnet 210 can include a plurality of pole pairs. First magnet 220 may be characterized by a first thickness h1. Second magnet 210 may be characterized by a second thickness h2. It is to be appreciated that the thickness of the magnet is associated with the strength of the magnetic field and/or the distance between the magnet and the sensor. The thickness of the magnets can be determined based on the specific design requirements of the magnetic encoder. For example, the first thickness h1 may be greater than 1.00 mm; the second thickness h2 may be greater than 1.00 mm.

In some embodiments, first pole pair 270 can be characterized by an axial magnetization, and second pole pair 210a can be characterized by a diametrical magnetization. For instance, the term "diametrical magnetization" refers to the magnetization direction of a magnet being through its diameter (e.g., along diametrical direction 250). The term "axial magnetization" may refer to the magnetization direction of the magnet being along its geometric axis or axial direction (e.g., rotational axis 240).

In various implementations, magnetic encoder 200 is characterized by an encoder resolution, which may refer to the number of segments or pulses that can be counted in one cycle of movement (e.g., a 360-degree revolution). The encoder resolution may be associated with the number of pole pairs in the magnet(s) (e.g., first magnet 220 and/or second magnet 210). Some approaches rely on only a single pole pair, generating a limited set of signals (e.g., a single pair of sine/cosine signals) during a full magnet rotation. The accuracy and performance of the magnetic encoder are thus largely dependent upon these limited signals. Disturbances to these signals, resulting from sources such as noise, distortion, or other magnetic interferences, may have adverse effects on the performance of the magnetic encoder. In contrast, embodiments of the subject technology allow for improved resolution with an increased number of pole pairs. Depending on the implementations, the number of pole pairs for the multi-pole magnet (e.g., first magnet 220 and second magnet 210 can range from a minimum of two to theoretically limitless counts (e.g., 8, 16, 32 . . . 8096, and so on).

Magnetic encoder 200 may further include a sensing unit 230 configured to detect the magnetic field of first magnet 220 and second magnet 210. As shown in FIG. 2B, sensing unit 230 may include a first sensor 290*a* and a second sensor 290*b*. To detect the magnetic field, first sensor 290*a* and second sensor 290*b* may be respectively positioned in close proximity to first magnet 220 and second magnet 210 and can be configured in various orientations depending on the magnetization direction of respective magnets. For instance, first sensor 290*a* includes a horizontal sensor positioned at a first proximity near first magnet 220. In an example, first sensor 290*a* includes a horizontal magnetic sensor positioned at a first proximity near first magnet 220. The term "horizontal sensor" may refer to a sensor that detects magnetic flux signals perpendicular to the surface of the semiconductor chip. First magnet 220 characterized by an axial magnetization may generate such magnetic flux patterns as illustrated in 280.

In various implementations, first sensor 290*a* is positioned at a first proximity near first magnet 220. First sensor 290*a* can be configured to detect changes in the first magnetic flux 280 and generate a first signal based on a first magnetic field signal associated with first magnet 220. In an example, first sensor 290*a* can be configured to detect changes in the first magnetic flux 280 and generate a first signal based on a first magnetic flux orientation associated with first magnet 220. First sensor 290*a* may include, but is not limited to, a Hall effect element, a magnetoresistive element, a magnetotransistor, and/or the combination thereof. In an example, first sensor 290*a* includes a first magnetic field sensor configured to detect the horizontal or perpendicular magnetic field of the axial magnetization. In some cases, first sensor 290*a* includes a Hall sensor. The term "Hall sensor" or "Hall effect sensor" refers to a sensor that detects the presence and magnitude of a magnetic field using the Hall effect. The Hall effect occurs when a conductor carrying electrical current is introduced into a magnetic field, consequently generating an output voltage (e.g., a Hall voltage) proportional to the strength of the magnetic field. For instance, the first magnetic field signal includes a Hall voltage based on a magnetic field direction or orientation of the first magnet 220. In an example, the first voltage includes a Hall voltage based on a magnetic field density of the first magnet 220. The term "Hall voltage" may refer to the voltage generated in a conductor due to the Hall effect when an electrical current is introduced into a magnetic field. The Hall voltage may be associated with the current, the magnetic field, and/or the like.

According to some embodiments, second sensor 290*b* includes a vertical sensor positioned at a second proximity near second magnet 210. The term "vertical sensor" may refer to a sensor that detects parallel magnetic flux to the surface of the semiconductor chip. Second magnet 210 characterized by a diametrical magnetization may generate a second magnetic flux pattern as illustrated in 270. Second sensor 290*b* may be configured to generate a second signal based on a magnetic flux direction or orientation associated with the second magnet 210. In an example, second sensor 290*b* includes a second magnetic field sensor configured to detect vertical or parallel magnetic fields of the diametrical magnetization. In some cases, second sensor 290*b* may be configured to generate a second signal based on a magnetic flux pattern associated with the second magnet 210. For example, second sensor 290*b* includes a Hall sensor and the signal generated includes a Hall-detected signal based on a magnetic field direction or orientation of the second magnet 210. It is to be appreciated that first sensor 290*a* and second sensor 290*b* are positioned in a way to effectively detect the magnetic field of respective magnets. In an example, first magnetic flux 280 is characterized by a first direction or orientation, second magnetic flux 270 is characterized by a second direction or orientation. The first direction may be different from the second direction such that first magnetic flux 280 can be isolated from second magnetic flux 270. For instance, at the first proximity, first magnetic flux 280 may be characterized by a first direction or orientation, which is perpendicular to the surface of the magnetic encoder and is hence different compared to the second magnetic flux 270 of second magnet 210, which is parallel to the surface of the magnetic encoder. This way, the isolation of separate magnetic fields of the first magnet 210 and the second magnet 220 can be achieved, such that the two magnets can be placed in close proximity to be detected within a single system such as sensing unit 230. In some embodiments, at the first proximity, first magnetic flux 280 of first magnet 220 is greater than the second magnetic flux 270 of second magnet 210. At the second proximity, the second magnetic flux 270 of the second magnet 210 is greater than the first magnetic flux 280 of the first magnet 220.

Depending on the implementations, first magnet 220 and second magnet 210 may be mounted on a rotating body (not shown, e.g., a rotor disc, a shaft, and/or the like) and can rotate around rotational axis 240 (e.g., in a first direction 280) relative to first sensor 290*a* and second sensor 290*b* during operation. As the magnet rotates, the strength of the magnetic field detected by the sensor varies, causing the direction or orientation of the magnetic flux cutting across the sensor to change. The change in magnetic flux pattern may subsequently be used to determine the angular position or rotation of the encoder.

First sensor 290*a* and second sensor 290*b* may be positioned with respect to rotational axis 240 in either an on-axis configuration or an off-axis configuration. In on-axis configuration, a sensor is positioned along the rotational axis of a magnet. For instance, the sensor may be positioned above or below a central rotation point of the magnet, in line with the rotational axis. In off-axis configuration, a sensor is positioned off the rotational axis of a magnet. For instance, the sensor may be positioned to a side of the rotational axis. In some embodiments, first sensor 290*a* is positioned off the rotational axis 240. This off-axis configuration allows for a reduced installation height and improved tolerance for sensor and magnet positioning, leading to enhanced accuracy and minimized latency. In an SoC arrangement, magnetic encoder sensor 230 may be positioned at a corner of the semiconductor chip, advantageously diminishing sensor signal crosstalk/interference by increasing the distance.

Figure 3:
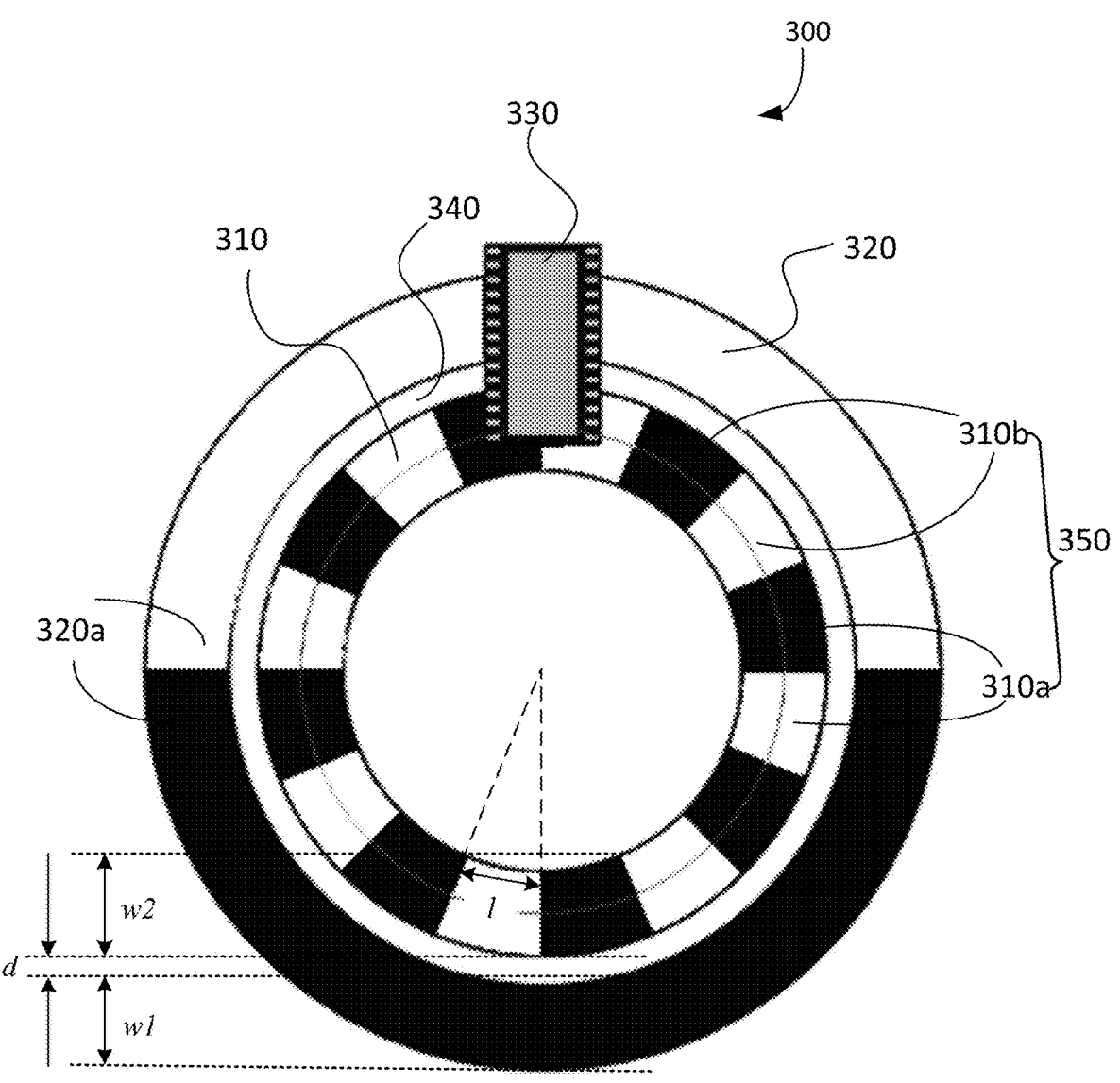
FIG. 3 is a simplified diagram illustrating an alternative exemplary magnetic encoder configuration according to embodiments of the subject technology.

FIG. 3 is a simplified diagram illustrating an alternative exemplary magnet encoder 300 according to embodiments of the subject technology. This diagram merely provides an example, which should not unduly limit the scope of the claims.

As shown, magnet encoder 300 includes a first magnet 320 and a second magnet 310. First magnet 320 may be characterized by a diametrical magnetization and second magnet 310 may be characterized by an axial magnetization. For example, first magnet 320 includes a first pole pair 320*a*, which may consist of a single pole pair. First magnet 320 may further include an opening 340. Second magnet 310 may be positioned in opening 340 and include a second pole pair 350, which may include a plurality of pole pairs (e.g., 310*a*, 310*b*, etc.). In second magnet 310, each pole is characterized by a pole length l. First magnet 320 is characterized by a first width w1 and second magnet 310 is characterized by a second width w2. The dimensions of the magnets (e.g., width, pole length, thickness, etc.) can be determined based on the specific design requirements of the magnetic encoder. For instance, the first width w1 may be greater than 1.00 mm. The second width w2 may be greater than or equal to 1.00 mm. The pole length/can be greater than or equal to 0.1 mm.

First magnet 320 and second magnet 310 may be coupled to each other or be separated from each other by a first distance d. The first distance d may be associated with the crosstalk between first magnet 320 and second magnet 310. Depending on the specific embodiments, first distance d may be greater than or equal to 0 mm, balancing the requirements of compactness and magnetic field isolation for optimal performance.

Magnetic encoder 300 may further include a sensing unit 330 configured to detect the magnetic field of first magnet 320 and second magnet 310. As first magnet 320 and second magnet 310 rotate with respect to sensing unit 330, sensing unit 330 detects the changes in the respective magnetic field and outputs electrical signals reflecting these changes. The output signal of sensing unit 330 is characterized by a first resolution, which can be affected by various factors (e.g., the number of pole pairs, the number of sensors, etc.). For instance, an increase in the number of pole pairs can augment the first resolution, making the output signal more robust against potential disturbances such as noise and distortion. The increased encoder resolution allows for a more accurate and precise determination of position, thereby improving the overall performance and reliability of the magnetic encoder.

Figure 4A:
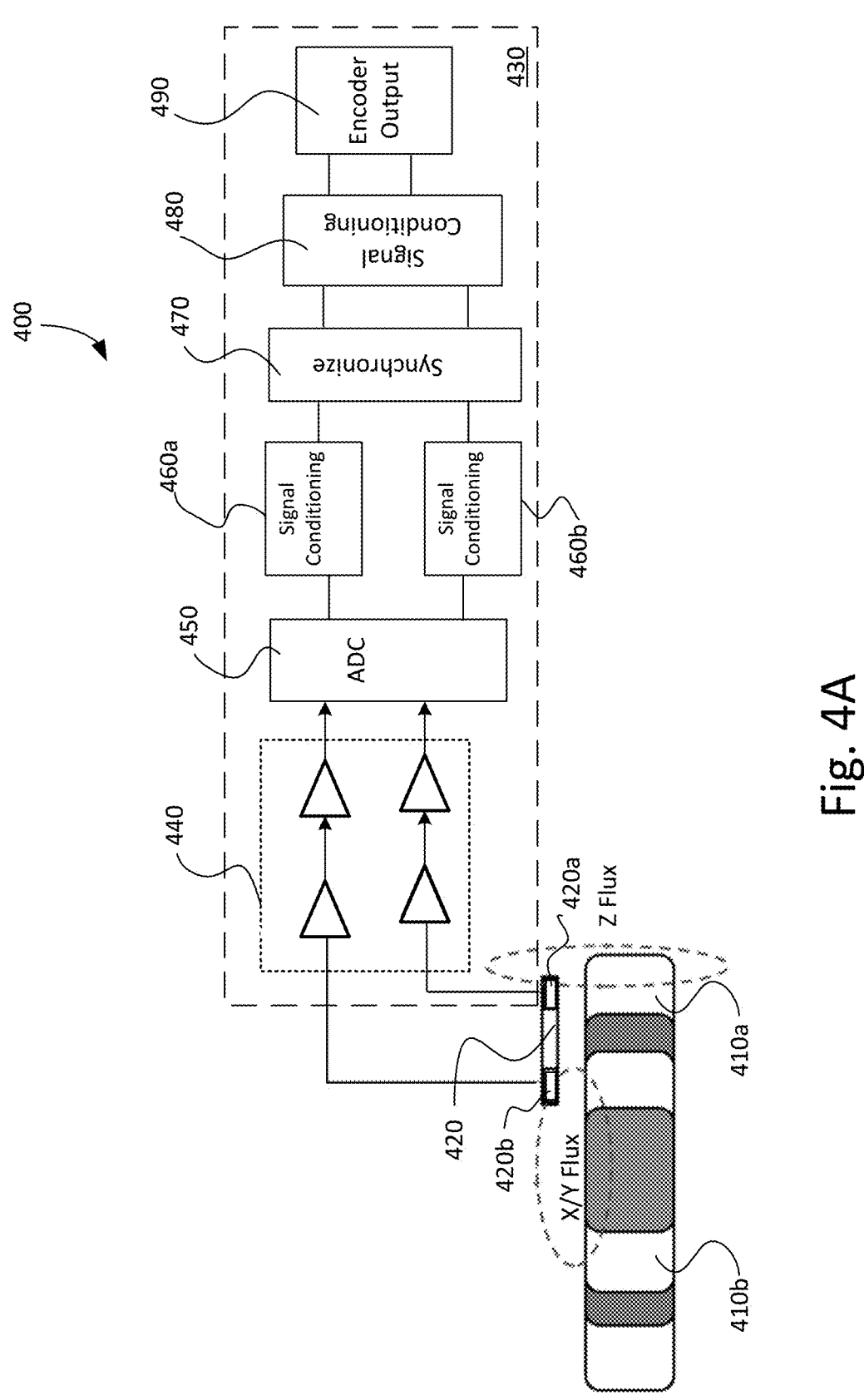
FIGS. 4A and 4B are simplified block diagrams illustrating components of exemplary magnetic encoders according to embodiments of the subject technology.
Figure 4B:
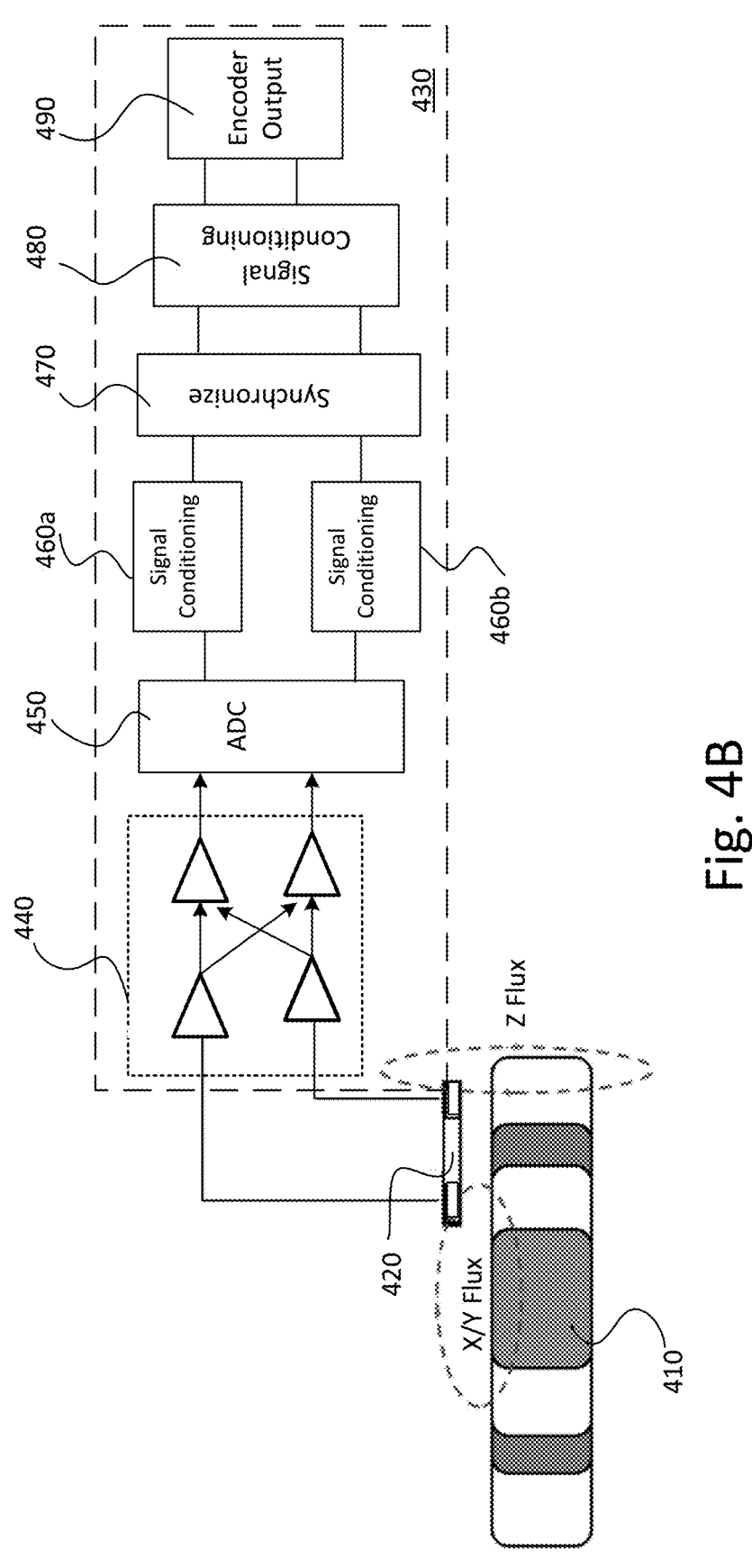

FIGS. 4A and 4B are simplified block diagrams illustrating components of exemplary magnet encoders 400 according to embodiments of the subject technology. These diagrams merely provide an example, which should not unduly limit the scope of the claims. One of ordinary skill in the art would recognize many variations, alternatives, and modifications. For example, one or more steps may be added, removed, repeated, modified, replaced, overlapped, and/or rearranged, and should not limit the scope of the claims. As an example, various functional blocks may be implemented using one or more hardware components, depending on the implementation. For example, processor 430 may include both analog components (e.g., analog front end, or AFE) and digital signal processing components.

As shown in FIG. 4A, magnet encoder 400 includes a first magnet 410a and a second magnet 410b, one of which comprises a plurality of pole pairs that allow for the generation of signals with enhanced resolution, while the other consists of a single pole pair. Sensing unit 420 includes a first sensor 420a and a second sensor 420b, which are configured to detect the respective magnetic field of first magnet 420a and second magnet 420b and output electrical signals reflecting the changes in the magnetic fields.

In some embodiments, first sensor 420a generates a first signal based on a first magnetic field signal with its direction or orientation associated with the first magnet 410a; second sensor 420b generates a second signal based on a second magnetic field signal with its direction or orientation associated with the second magnet 410b. In an example, first sensor 420a generates a first signal based on a first magnetic flux orientation associated with the first magnet 410a; second sensor 420b generates a second signal based on a second magnetic flux orientation associated with the second magnet 410b. For instance, first sensor 420a includes a Hall sensor and the first magnetic field signal includes a Hall voltage based on a magnetic field density of first magnet 410a. In an example, the first signal and the second signal may include a set of analog signals (e.g., differential sine/cosine signals) associated with the angular position of the magnetic encoder. The first signal may include a predetermined number of cycles corresponding to the number of pole pair(s) in first magnet 410a. The second signal may include a predetermined number of cycles corresponding to the number of pole pair(s) in second magnet 410b. The configurations of first magnet 410a, second magnet 410b, sensing unit 420, first sensor 420a, and second sensor 420b may be the same as or equivalent to the components described with respect to FIGS. 1-3 and will not be described in further detail herein.

In order to determine the angular position of the magnetic encoder, the first signal and the second signal may be transmitted to a processor 430 (e.g., a microcontroller, a microprocessor, or the like) for further signal processing and computing. In an example, processor 430 includes an integrated system configured to remove the effects of crosstalk and or interference between the signals detected and generated from first magnet 410a and second magnet 410b. For example, processor 430 includes an amplifier 440, which is configured to amplify the first signal and the second signal and provide a first amplified signal and a second amplified signal. The term "amplifier" may refer to an electronic element that can increase the magnitude of a signal (e.g., a time-varying voltage or current) and can include, without limitations, a transistor amplifier, an operational amplifier, a differential amplifier, a differential difference amplifier, and/ or the like. In an example, as shown in FIG. 4B, amplifier 440 may include a differential difference amplifier configured to remove a difference between the first signal and the second signal. At amplifier 440, the first signal and the second signal may be weighted and subtracted from one another to remove the effects of crosstalk between first magnet 410a and second magnet 410b. In an example, simplifier 440 may be configured to remove interference between the first signal and the second signal and to provide a first amplified signal and a second amplified signal.

Processor 430 includes an analog-to-digital converter (ADC) 450 configured to convert the first signal and the second signal to digital signals. The term "analog-to-digital converter" may refer to an electronic device that converts an analog signal into a digital signal. ADC 450 may include, but is not limited to, a flash ADC, a dual-slope ADC, a successive approximation ADC, and/or the like. In some embodiments, ADC 450 is configured to convert the first amplified signal to a first digital signal and to convert the second amplified signal to a second digital signal. In an example, ADC 450 may be configured to convert the first amplified signal to a first digital signal and to convert the second amplified signal to a second digital signal.

During the operation of the magnetic encoder, various factors (e.g., temperature fluctuation, spatial change, variations in magnet type and arrangement, etc.) can contribute to the non-ideal behaviors of the first signal and the second signal. These non-idealities have the potential to degrade the accuracy of the encoder and disrupt synchronization between the first signal and the second signal, potentially causing substantial discontinuities in position calculations (e.g., exceeding 180 electrical degrees in magnitude). To ensure the accuracy of the position calculation, the first signal and the second signal may be conditioned to remove imperfections and improve the signal quality for further processing (e.g., synchronization) and position calculation.

According to some embodiments, the first signal (or the first amplified signal) may be conditioned at a first signal condition module 460a. The second signal (or the second amplified signal) may be conditioned at a second signal condition module 460b. The term "signal conditioning" may refer to the manipulation or conversion of a signal in such a way that it can be processed or analyzed by a subsequent device or system. Signal conditioning can involve a variety of operations, such as amplification, filtering, converting, range matching, isolation, temperature compensation, and/ or the like. For example, signal conditioning processes may be performed by one or more digital signal processor (DSP) units or general processing devices. While first signal conditioning module 460a and second signal condition module 460b are shown to be external from sensing unit 420 in FIGS. 4A-4B, it is to be appreciated that one or more signal conditioning operations can also be performed within sensing unit 420.

In various implementations, processor 430 further includes a synchronization module 470 configured to synchronize the first signal and the second signal. The term "synchronize" or "synchronization" may refer to any method or operation that facilitates alignment, matching, or coordinated interaction between the first signal and the second signal. This may include, but is not limited to, absolute synchronization (e.g., the signals reach all corresponding points at the same time) or relative synchronization (e.g., the signals maintain a consistent time difference). The phrase "synchronize" or "synchronization" may also include matching or aligning one or more characteristics of the signals, which may include, without limitation, phase, frequency, amplitude, waveform shape, and/or the like. In an example, synchronization module 470 may be configured to synchronize the first digital signal and the second digital signal. In various implementations, the first digital signal and the second digital signal output by ADC 450 may be synchronized by synchronization module 470. To achieve synchronization between the first digital signal and the second digital signal, a first most significant bit of the first digital signal may be synchronized with a second most significant bit of the second digital signal. The term "most significant bit (MSB)" may refer to the bit that has the greatest value in a multi-bit binary number. MSB may be the bit that is farthest to the left. In some embodiments, synchronization module 470 may be further configured to remove mismatches (e.g., phase mismatch, gain mismatch, etc.) between the first digital signal and the second digital signal. To calculate the angular position of the magnetic encoder, synchronization module 470 may perform an arctangent ($\tan^{-1}$ (sin/cos)) operation for both the first signal and the second signal. In some cases, synchronization module 470 is further configured to remove mismatches between the first digital signal and the second digital signal.

While the angular position can be obtained once the synchronization process has been completed, prior signal conditioning processes (e.g., at first signal conditioning module 460a and second signal conditioning module 460b) and/or synchronization process (e.g., at synchronization module 470) may introduce certain after-effects to the final output (e.g., the angular position), causing noise or distortion that may degrade the accuracy and reliability of the output position data. As such, a third signal conditioning module 480 may be implemented to further refine the output signals of synchronization module 470 via one or more signal conditioning operations. For example, third signal conditioning module 480 can perform a look-up table (LUT) correction to correct errors (e.g., non-linearity, drift, noise, crosstalk, shape distortion, or the like) in the magnetic encoder's output signal 490. In some cases, digital filtering may also be performed at third signal conditioning module 480 to reduce noise and/or interference and improve the quality of the output signal 490.

Figure 5A:
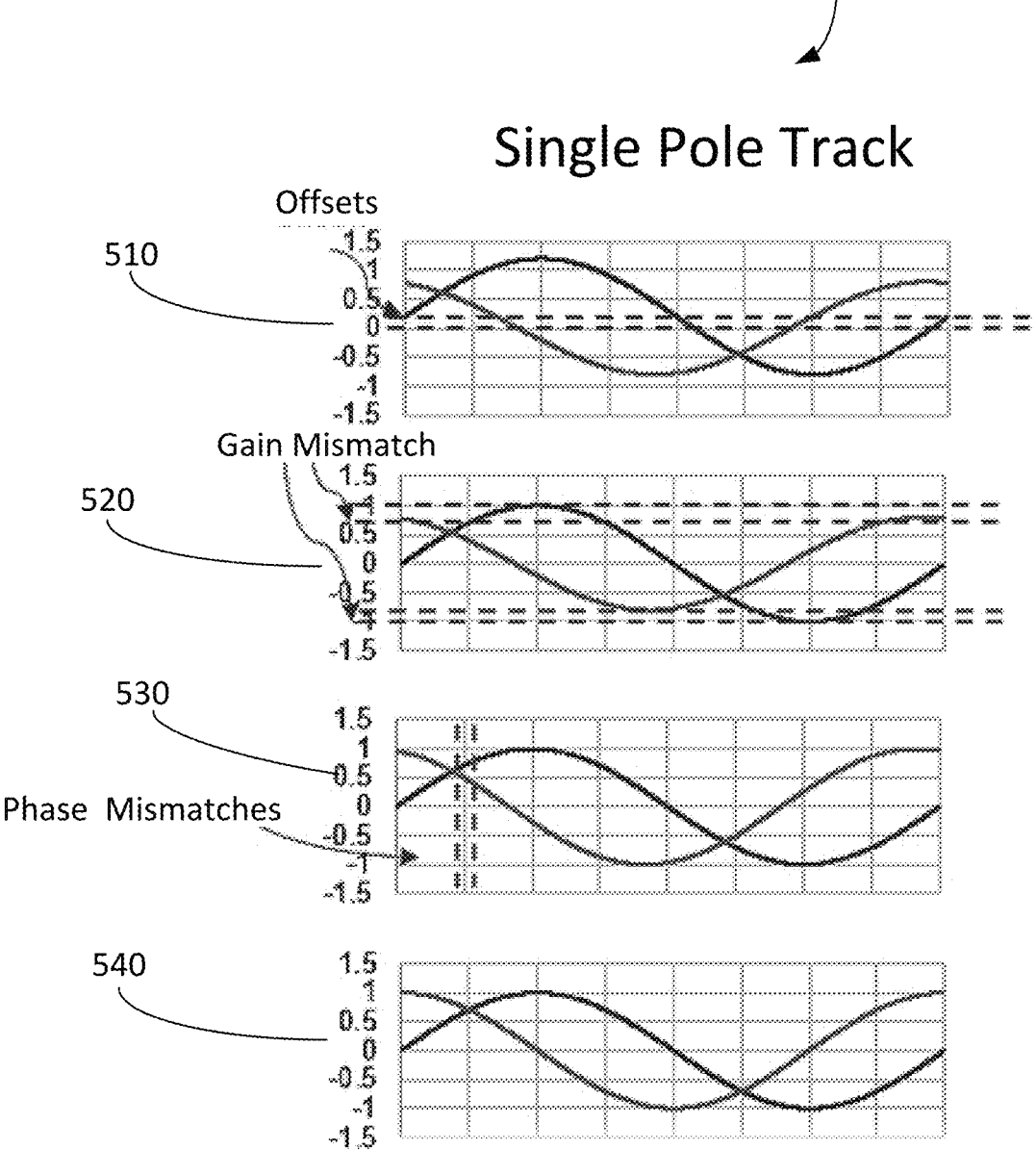
FIGS. 5A-5B are graphs illustrating signal conditioning processes performed according to embodiments of the subject technology.
Figure 5B:
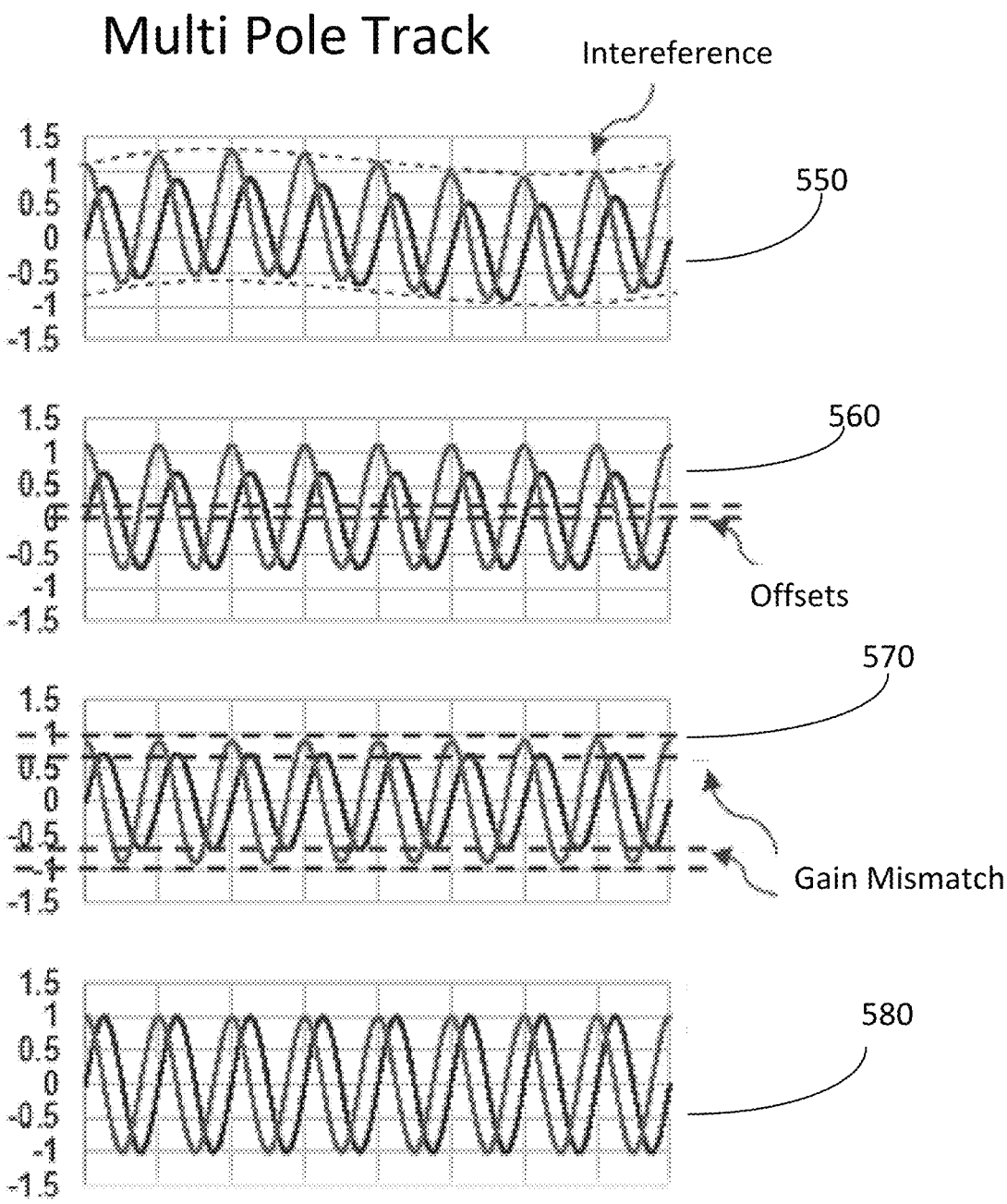

FIGS. 5A-5B are graphs illustrating signal conditioning processes 500 performed according to embodiments of the subject technology. These diagrams merely provide an example, which should not unduly limit the scope of the claims. For instance, signal conditioning processes 500 may be performed by first signal conditioning module 460a and second conditioning module 460b of FIGS. 4A-4B. Signal conditioning process 500 serves to eliminate or minimize the non-idealities of the first signal and the second signal generated by the first sensor 420a and second sensor 420b. As discussed earlier, one of the magnets (e.g., first magnet 410a and second magnet 410b of FIG. 4) can include a plurality of pole pairs (referred to as "multi-pole track") while the other may consist of single pole pair (referred to as "single pole track").

FIG. 5A illustrates the signal conditioning operations performed on the signal associated with the single pole track (referred to as "SP signal"). FIG. 5B are graphs illustrating the signal conditioning operations performed on the signal associated with the multi-pole track (referred to as "MP signal"). Depending on the implementations, the first signal and the second signal—both of which may include a sine component and a cosine component—may be affected by random noises, mechanical error, sensor structure, analog amplifier, temperature fluctuation, etc. Consequently, the first signal and the second signal may exhibit various non-idealities. For example, as shown in FIG. 5A, the SP signal may include a shift 510 in the midpoint voltage $V_{mid}$ of the sine and cosine signals (which may be referred to as "$V_{mid}$ shift"). For instance, the sine and cosine signals may not exhibit identical midpoint voltage $V_{mid}$. To counteract this, $V_{mid}$ shift 510 may be removed by dynamically identifying the $V_{mid}$ of each signal and applying an offset to correct this discrepancy.

In other examples, the SP signal may include a shift 520 in the peak-to-peak voltage $V_{pp}$ of sine and cosine signals (which may be referred to as "$V_{pp}$ shift"). The $V_{pp}$ shift 520 can be observed when the sine and cosine signals do not exhibit identical $V_{pp}$. $V_{pp}$ shift 520 can be corrected by dynamically detecting the $V_{pp}$ of each signal and applying a gain multiplier accordingly.

In some cases, the ideal phase relationship of sine and cosine signals—a 90-degree difference—can sometimes be disrupted, leading to a phase shift 530. For example, phase shift 530 can be minimized by dynamically detecting the phase of each signal and applying an offset correction. A phase correction 540 may therefore be achieved by aligning the phase of sine and cosine signals.

As shown in FIG. 5B, the MP signal may include a plurality of sine and cosine signals. The number of sine and cosine signals may correspond to the number of pole pairs in the multi-pole track. In some cases, harmonic interference 550 can occur between SP single and MP signal. For instance, multi-pole sine and cosine signals might be superimposed by single-pole magnetic flux, or vice versa. To mitigate this, the signal conditioning process can achieve the first harmonic interference removal 560 by dynamically detecting the magnitude of the first harmonic component of multi-pole sine and cosine signals across every 360 mechanical degrees of revolution. A cancellation operation can then be applied to the multi-pole sine and cosine signals using the single-pole sine and cosine signals with a gain multiplier.

In some embodiments, signal conditioning process 500 may also include an offset correction 570. For instance, the midpoint voltage $V_{mid}$ can be used to correct offset (e.g., caused by amplifier 440 of FIGS. 4A-4B). The offset voltage is the voltage that appears at the output of an amplifier when the input is zero. To correct the offset voltage, the midpoint voltage $V_{mid}$ can be adjusted by adding or subtracting a voltage. Before adjusting the offset voltage, the midpoint voltage $V_{mid}$ may be normalized first to reach a reference value. In some cases, signal conditioning process 500 may further include a gain correction 580, which can be achieved by normalizing peak-to-peak voltage $V_{pp}$.

Figure 6:
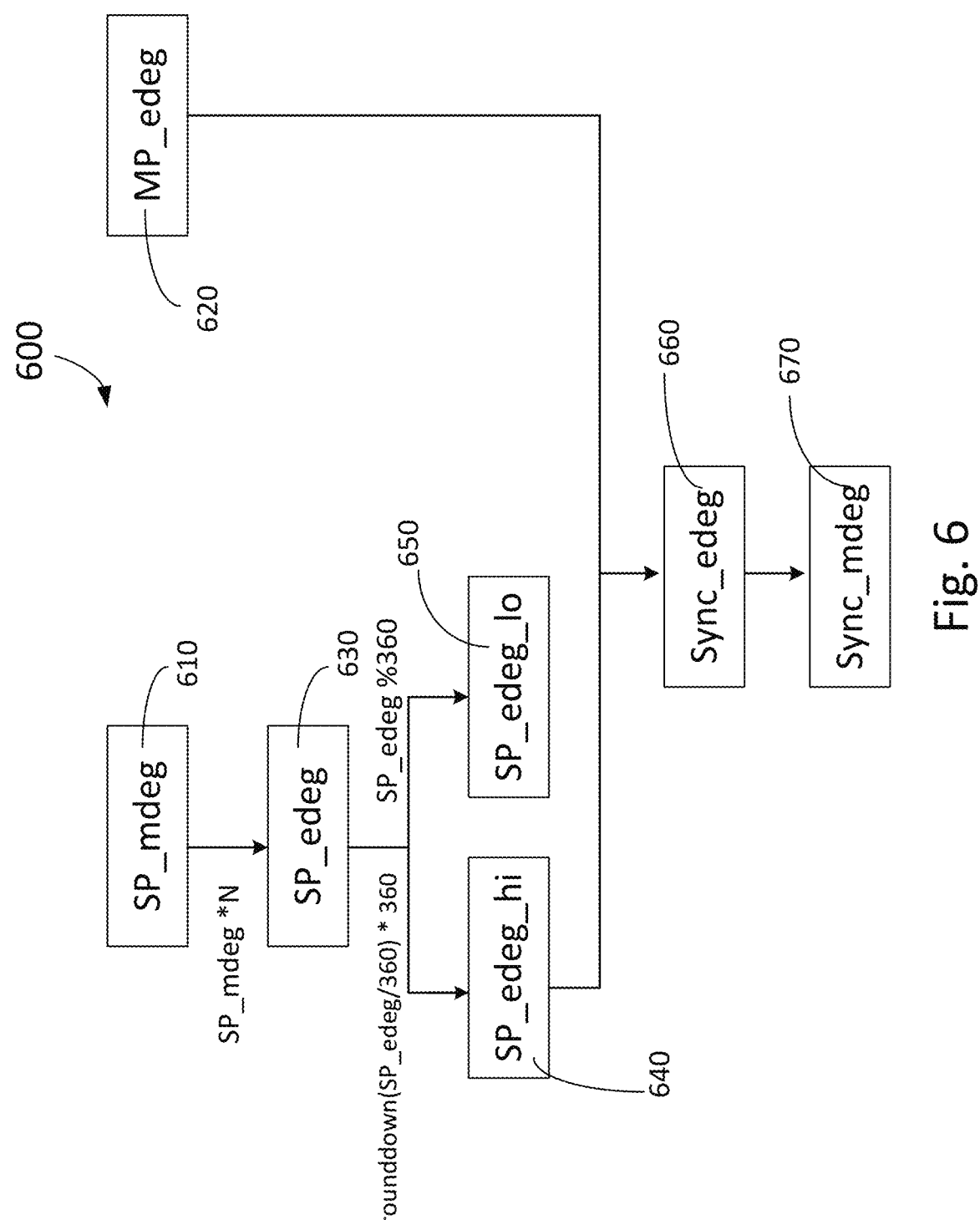
FIG. 6 is a simplified flow diagram illustrating a pre-process for signal synchronization according to embodiments of the subject technology.

FIG. 6 is a simplified flow diagram illustrating a pre-process 600 for signal synchronization according to embodiments of the subject technology. This diagram merely provides an example, which should not unduly limit the scope of the claims. In various implementations, to achieve proper synchronization, the SP signal may be spliced according to the number of MP signals. As shown, first SP signal 610 is characterized by a first mechanical angle (e.g., from 0 to 360 mdeg); first MP signal 620 is characterized by a first electrical angle (e.g., from 0 to 360 edeg). For example, first MP signal 620 includes N number of sine/cosine signals, corresponding to N number of pole pairs in the multi-pole track. The term "mechanical angle" may refer to the physical rotation angle of a mechanical component. For instance, when the magnetic encoder rotates, the rotation can be described using a mechanical angle. The term "electrical angle" may refer to the angle between poles and can be defined relative to the mechanical angle.

A second SP signal 630 may be obtained by scaling first SP signal 610 by the factor of N. Second SP signal 630 may be characterized by a second electrical angle (e.g., from 0 to (N*360) edeg). A high SP component 640 and a low SP component 650 may be obtained using second SP signal 630 via mathematical operations. High SP component 640 may be characterized by a third electrical angle (e.g., from 0 to (N−1)*360 edeg). Low SP component 650 may be characterized by a fourth electrical angle (e.g., from 0 to 360 edeg). Following this, synchronization can be performed using high SP component 640, low SP component 650, and first MP signal 620 to obtain a first synchronized signal 660. First synchronized signal 660 may be characterized by a fifth electrical angle (e.g., from 0 to (N*360) edeg). Finally, first synchronized signal 660 can be converted back into mechanical degrees, generating a second synchronized signal 670, which is characterized by a second mechanical angle (e.g., from 0 to 360 mdeg).

Figure 7:
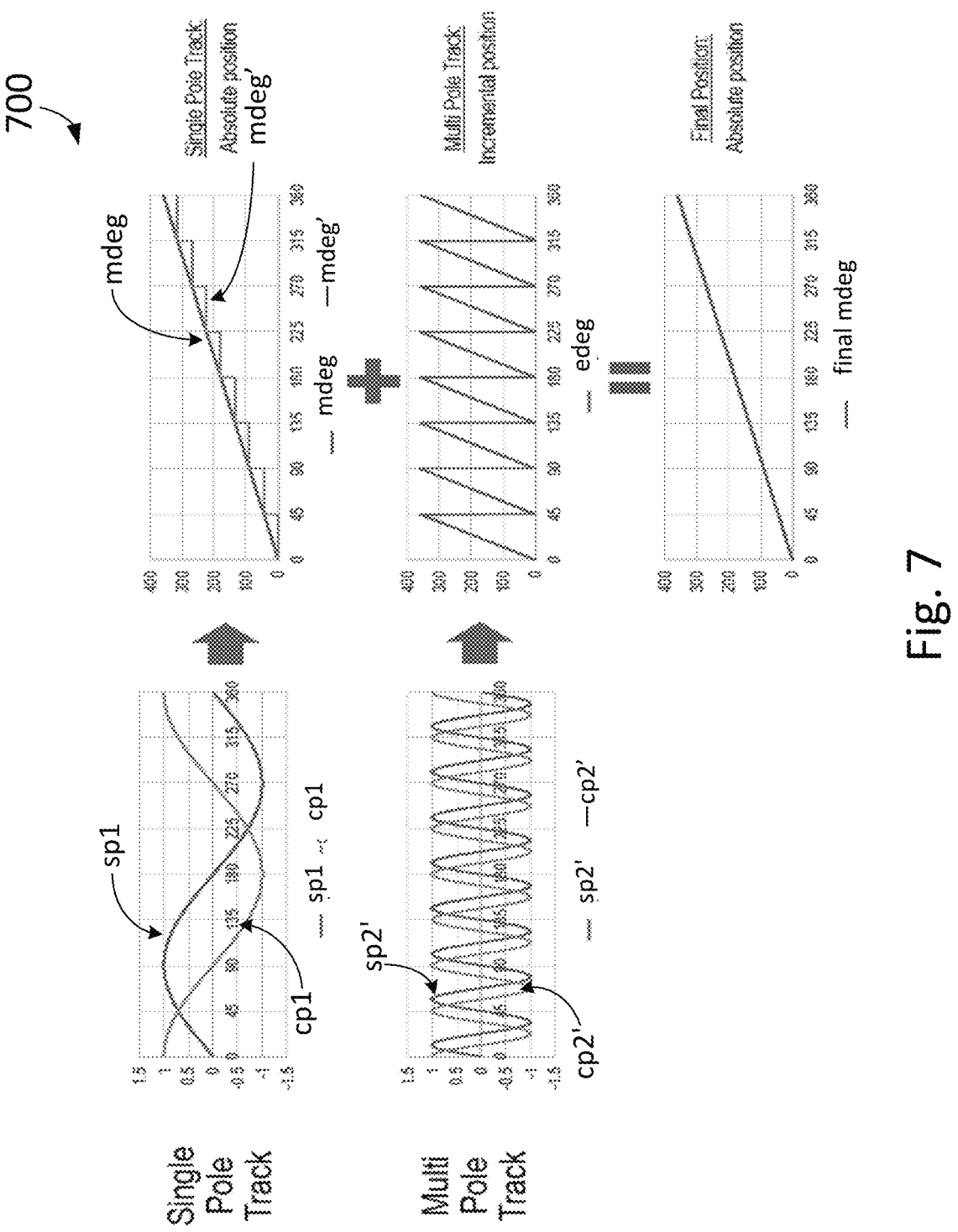
FIG. 7 is a simplified flow diagram illustrating a process for signal synchronization according to embodiments of the subject technology.

FIG. 7 is a simplified flow diagram illustrating process 700 for signal synchronization according to embodiments of the subject technology. This diagram merely provides an example, which should not unduly limit the scope of the claims. As shown, in magnetic encoders, two types of signals are utilized to obtain the positional information: Single Pole (SP) signals and Multi-pole (MP) signals. As shown, SP signals can offer absolute positional information and MP signals can provide incremental positional data. The information from both SP and MP signals is processed and synchronized to yield the final absolute position of the rotating body associated with the magnetic encoder. For instance, the signal synchronization process 700 may be performed at synchronization module 470 of FIGS. 4A-4B.

In various implementations, the SP signal provides an absolute position once per revolution, offering a coarse position over an extended range. This is due to its characteristic structure where each revolution of the magnetic encoder equates to one full sinusoidal wave of the SP signal. This waveform correlation allows the SP signal to track the absolute position across multiple revolutions of the encoder, inherently distinguishing each complete revolution as a distinct cycle.

On the other hand, the MP signal can provide incremental position information. The MP signal exhibits multiple sinusoidal waves—corresponding to the number of pole pairs in the MP track—within one revolution of the encoder. While the MP signal can provide a higher resolution position compared to the SP signal, the MP signal cannot differentiate between successive rotations and provide absolute positions. In other words, an MP signal can provide more precise information about the position within a single revolution but lacks in conveying the number of complete rotations.

Synchronization process 700 is configured to synchronize the SP and MP signals to exploit their complementary strengths, thereby producing a final signal that provides absolute positions with a high degree of resolution.

While the above is a full description of the specific embodiments, various modifications, alternative constructions and equivalents may be used. Therefore, the above description and illustrations should not be taken as limiting the scope of the subject technology which is defined by the appended claims.

What is claimed is:

1. A magnetic encoder device for measuring a position of an object, the device comprising:
   a first magnet comprising a first pole pair and an opening, the first magnet being characterized by a diametrical magnetization, the diametrical magnetization being associated with a first magnetic flux orientation along a diametrical direction orthogonal to a rotational axis;
   a second magnet comprising a second pole pair, the second magnet being positioned inside the opening;
   a first sensor configured to generate a first signal based on the first magnetic flux orientation associated with the first magnet;
   a second sensor configured to generate a second signal based on a second magnetic flux orientation associated with the second magnet; and
   a processor configured to determine the position based on at least the first signal and the second signal, the processor being further configured to condition the first signal and the second signal by processing a single-pole track associated with the first magnet and a multi-pole track associated with the second magnet and to provide harmonic interference removal;
   wherein the first signal comprises a first most significant bit and the second signal comprises a second most significant bit, the processor being configured to remove a mismatch between the first signal and the second signal with the first most significant bit of the first digital signal being synchronized with the second most significant bit of the second digital signal.

2. The magnetic encoder device of claim 1, wherein the first magnet is characterized by a ring shape.

3. The magnetic encoder device of claim 2, wherein the second magnet is characterized by a second shape, the first magnet and the second magnet share a center.

4. The magnetic encoder device of claim 2, wherein the first magnet comprises a rotational axis, the first sensor being positioned off the rotational axis.

5. The magnetic encoder device of claim 1, wherein:

the first sensor is positioned at a first proximity near the first magnet and the second sensor is positioned at a second proximity near the second magnet; and a first magnetic flux of the first magnet is greater than a second magnetic flux of the second magnet at the first proximity.

6. The magnetic encoder device of claim 1, wherein the first pole pair is characterized by a diametrical magnetization and the second pole pair is characterized by an axial magnetization.

7. The magnetic encoder device of claim 1, wherein the processor comprises an amplifier configured to remove a difference between the first signal and the second signal.

8. The magnetic encoder device of claim 1, wherein the processor is configured to synchronize the first signal and the second signal.

9. The magnetic encoder device of claim 1, wherein the processor comprises an analog-to-digital converter (ADC) configured to convert the first signal and the second signal to digital signals.

10. The magnetic encoder device of claim 1, wherein the first magnet comprises a plurality of pole pairs and the second magnet consists of the second pole pair.

11. The magnetic encoder device of claim 1, wherein the second magnet comprises a plurality of pole pairs and the first magnet consists of the first pole pair.

12. The magnetic encoder device of claim 1, wherein a first voltage comprises a Hall voltage based on a magnetic field density of the first magnet.

13. A magnetic encoder device for measuring a position of an object, the device comprising:

a first magnet comprising a plurality of pole pairs and an opening;

a second magnet comprising a first pole pair, the second magnet being positioned inside the opening characterized by a diametrical magnetization;

a first sensor configured to generate a first signal associated with the first magnet;

a second sensor configured to generate a second signal associated with the second magnet;

an amplifier configured to remove a difference between the first signal and the second signal to provide a first amplified signal and a second amplified signal;

signal conditional modules configured to condition the first signal and the second signal by processing a single-pole track associated with the second magnet and a multi-pole track associated with the first magnet and to provide harmonic interference removal;

an analog to digital converter configured to convert the first amplified signal to a first digital signal and to convert the second amplified signal to a second digital signal; and a synchronization module configured to synchronize the first digital signal and the second digital signal and remove a mismatch between the first signal and the second signal with a first most significant bit of the first digital signal being synchronized with a second most significant bit of the second digital signal.

14. The magnetic encoder device of claim 13, wherein the first magnet is characterized by a ring shape.

15. The magnetic encoder device of claim 13, wherein the synchronization module is further configured to remove mismatches between the first digital signal and the second digital signal.

* * * * *